United States Patent [19]
Anderson et al.

[11] 4,162,060
[45] Jul. 24, 1979

[54] SEMI-AUTOMATIC WATER TABLE

[75] Inventors: Harry E. Anderson, Pittsburgh; Kenneth E. Helsel, Sewickley; Raymond E. Heasley, McKees Rocks, all of Pa.

[73] Assignee: Anderson Engineers, Inc., Carnegie, Pa.

[21] Appl. No.: 789,509

[22] Filed: Apr. 21, 1977

[51] Int. Cl.² ............................................. B23K 7/08
[52] U.S. Cl. ...................................... 266/49; 266/65
[58] Field of Search ................ 148/9 R; 266/49, 65

[56] References Cited

U.S. PATENT DOCUMENTS

| | | | |
|---|---|---|---|
| 3,526,395 | 9/1970 | Brown | 266/65 X |
| 3,743,260 | 7/1973 | Alleman et al. | 266/49 |
| 3,769,097 | 10/1973 | Walters et al. | 148/9 R |
| 3,969,132 | 7/1976 | Anderson et al. | 266/48 X |

FOREIGN PATENT DOCUMENTS

| | | | |
|---|---|---|---|
| 2412782 | 12/1974 | Fed. Rep. of Germany | 266/65 |
| 464414 | 9/1975 | U.S.S.R. | 266/49 |
| 479602 | 11/1975 | U.S.S.R. | 266/65 |

*Primary Examiner*—Roy Lake
*Assistant Examiner*—Paul A. Bell
*Attorney, Agent, or Firm*—Webb, Burden, Robinson & Webb

[57] ABSTRACT

A water table suitable for use with a burning machine includes a water-holding tank, means for changing the water level in the tank and means for collecting swarf or waste material from the burning operation. A burning table is provided by one or more frames carrying burning bars, positioned in the tank above the water level changing means. The waste collection means may also be positioned in the tank below the frames.

19 Claims, 21 Drawing Figures

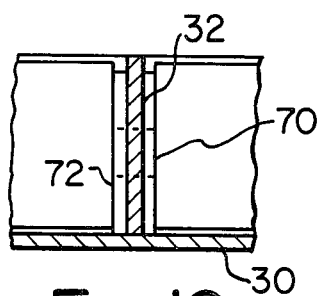
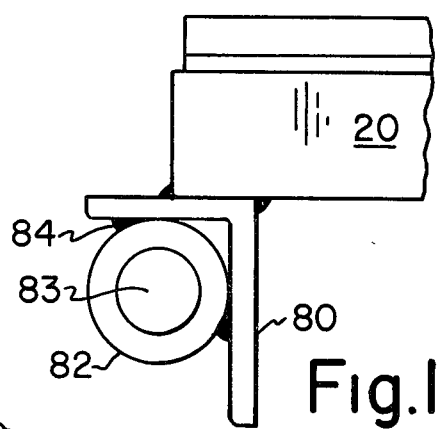
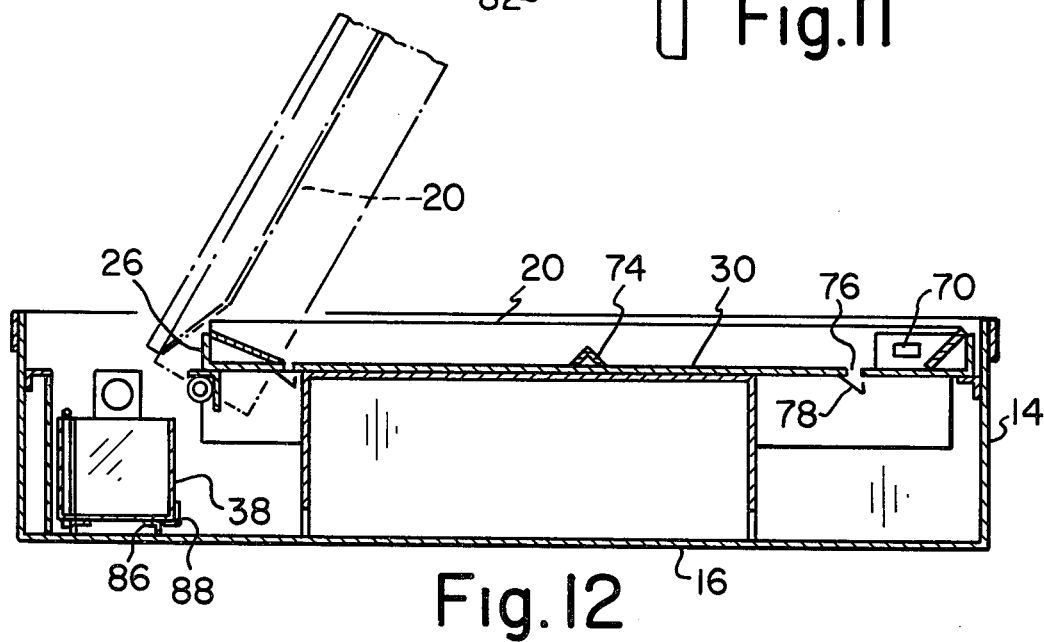
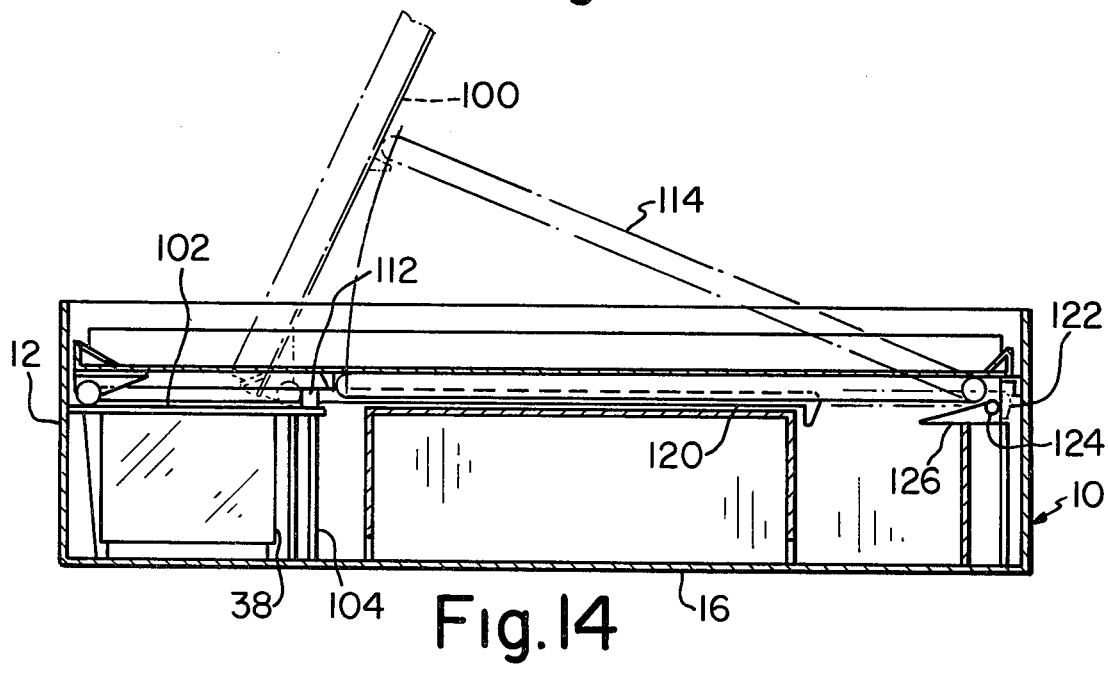

SEMI-AUTOMATIC WATER TABLE

FIELD OF THE INVENTION

The present invention relates to water tables and particularly to a water table suitable for use with burning machines such as those used in plasma arc, oxy-fuel, powder burning and other types of metal burning operations.

BACKGROUND OF THE INVENTION

In the use of burning machines, means for proper and efficient disposal of the swarf or waste material produced is required. The usual practice has been to provide, beneath the burning table, a water table or tank into which the swarf falls. Thereafter, the swarf is emptied from the table, usually into a suitable drain or floor duct. To insure that the maximum amount of swarf reaches the water in the tank and does not pollute the surrounding environment and to protect the bars of the burning table, it is desirable to bring the level of the water to the top of the burning bars of the burning table and as close as possible to a workpiece extended across the bars for cutting. However, it is also sometimes necessary to lower the water level below the burning bars to permit inspection of the burning table, to allow workmen to remove a workpiece or scrap or for other similar purposes. In addition, it is essential that the means provided for removing the swarf or waste material from the burning table and the water table be quickly, efficiently and economically operated.

It is known that the water level in a container can be changed by introducing an amount of air sufficient to displace the water to the extent desired. This principle is sometimes referred to as "air over water". It has been employed in prior water tables, for example, in those described in U.S. Pat. No. 3,743,260 and in a design of Hyster Company reported in the April 1975 issue of Welding Design and Fabrication, pp. 106-7. It has not been used previously, however, in a structure of the type disclosed and claimed herein which incorporates in a simple water table design many desirable features including improved access to the burning table and ease and improved efficiency of collection of swarf or waste material.

SUMMARY OF THE INVENTION

A water table suitable for use with a burning machine according to the invention comprises a water-holding tank, means for changing the water level in the tank and means for collecting swarf or waste material from the burning operation. A burning table is provided by one or more frames carrying burning bars, positioned in the tank above the water changing means. The frame means is or are mounted in the tank in a manner so as to be vertically moveable relative to the tank, that is, the frame means may be removed from, pivoted, tilted, or otherwise raised with respect to the tank. The waste collection means may also be positioned in the tank below the frames. In presently preferred embodiments of the invention, the water table includes a water level changing means comprising a substantially closed chamber having openings along its sides adjacent the bottom of the water-holding tank for allowing water to enter the chamber and means for introducing gas, e.g. air, into the chamber over the water to displace the water to such an extent that the water level in the water-holding tank is changed, as desired. The waste collection means may be in the form of a container, as described hereinafter, or with appropriate modifications to the bottom of the waterholding tank, automatic waste disposal means may be provided such as disclosed in U.S. Pat. No. 3,969,132, owned by the assignee of the present invention.

An understanding of the present invention will be achieved from the following description when taken with the accompanying drawings. The same reference numerals are used to identify the same items in each of the Figures of the drawings.

BRIEF DESCRIPTION OF THE DRAWINGS

In the drawings:

FIG. 10 is an enlarged view of the structure shown in the circle X of FIG. 7;

FIG. 11 is an enlarged view of the structure shown in the circle of XI of FIG. 9;

FIG. 12 is a reduced cross-sectional view taken along lines XII—XII of FIG. 1;

FIG. 14 is a cross-sectional view taken along lines XIV—XIV of FIG. 13;

DESCRIPTION OF PREFERRED EMBODIMENTS OF THE INVENTION

Figure 1:
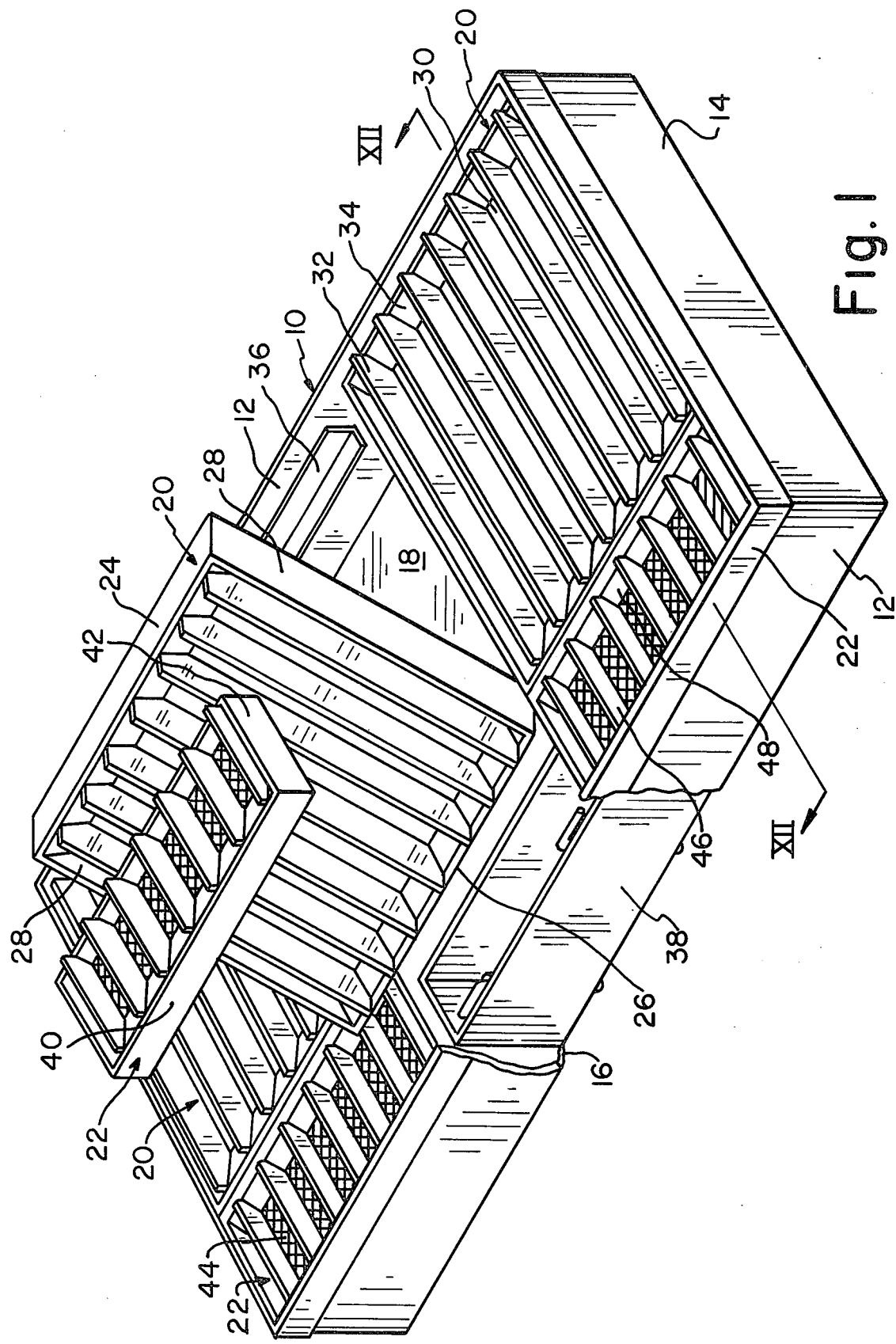
FIG. 1 is a schematic perspective view of one embodiment of a water table with a plurality of frames forming a burning table, according to the invention.

A water table for a burning machine (not shown) comprises, as shown in FIG. 1, a generally rectangular tank 10 for holding water. The tank 10 has two side walls 12, two end walls 14, and a bottom wall 16. In a preferred form of table, the side walls 12 are about twenty one feet long and the end walls 14 are about eight feet wide; however, it is apparent that tables having other dimensions are within the scope of the invention. A plurality of frames forming a burning table are positioned in the top or open side of the tank 10 above a chamber 18 in a manner so as to be moveable relative to the tank, which will be described in detail hereinafter. As shown in FIG. 1, there may be three dumping frames 20 and three access frames 22, or any other convenient number depending upon the size of the tank 10.

Each dumping frame 20 comprises a rectangular box-like structure having side walls 24, 26, end walls 28 and a substantially solid or imperforate bottom wall 30. A plurality of burning bars 32 extend from one side wall to the other and are fastened thereto, for example by welding, and to the bottom wall 30. The bars may be also removably mounted in the frame 20. Individual plates 34 are positioned at an angle, for example of about 30°–45°, between the bars 32 at each end thereof and are welded to the side walls 24, 26 and to the bottom wall 30. The plates 34 separate the burning bars 32, provide rigidity to the frame, and facilitate dumping of the swarf or waste material from the frame. Preferably, the height of each burning bar 32 is greater than the height of the side walls 24, 26 and end walls 28 to permit water to enter the frame over the walls, but below the top of the burning bars. In a preferred embodiment of the table, the walls are 2–3" high and bars 32 are approximately 4" high. However, as will become apparent, appropriate variations in this relationship may be employed without affecting the operation of the water table.

The dumping frames 20 are preferably pivotably mounted in the top of the tank, the free edge normally resting on suitable supports such as angles 36, so that swarf or waste material in the frames can be emptied into suitable portable collection containers 38 preferably located (as shown) in the bottom of the tank. It will be apparent to those skilled in the art that the access frames may be eliminated and if the pivot points of the dumping frames are moved closer to side walls 12, waste material may be dumped into one or more collection containers positioned on the outside of the tank adjacent a side wall.

In a first embodiment of the invention shown in FIGS. 1 through 12 of the drawings, access frames 22 of the water table are positioned above the collection containers and are in the top or open side of the tank adjacent the dumping frames 20. Each access frame 22 comprises a rectangular box-like structure having side walls 40, end walls 42 and a perforate bottom wall 44, preferably of a wire mesh material, which permits swarf or waste material from the burning operation to fall directly into the collection container 38 therebelow. Burning bars 46 are secured, either permanently or removably, to the opposed side walls 40. Individual plates 48 may be provided between the bars 46 to space and support them. The access frames 22 are preferably substantially smaller than the dumping frames 20 and are adapted to be lifted out of the enclosure completely (as shown in FIG. 1) for example by a crane to permit the collection containers 38 to be removed from the tank 10 for disposal of the swarf or waste material which has been collected.

Other and preferred features of the invention will be discussed with respect to the detailed drawings. It should be understood that the structure described may be subject to various changes and modifications as will be appreciated by those skilled in the art.

Figure 2:
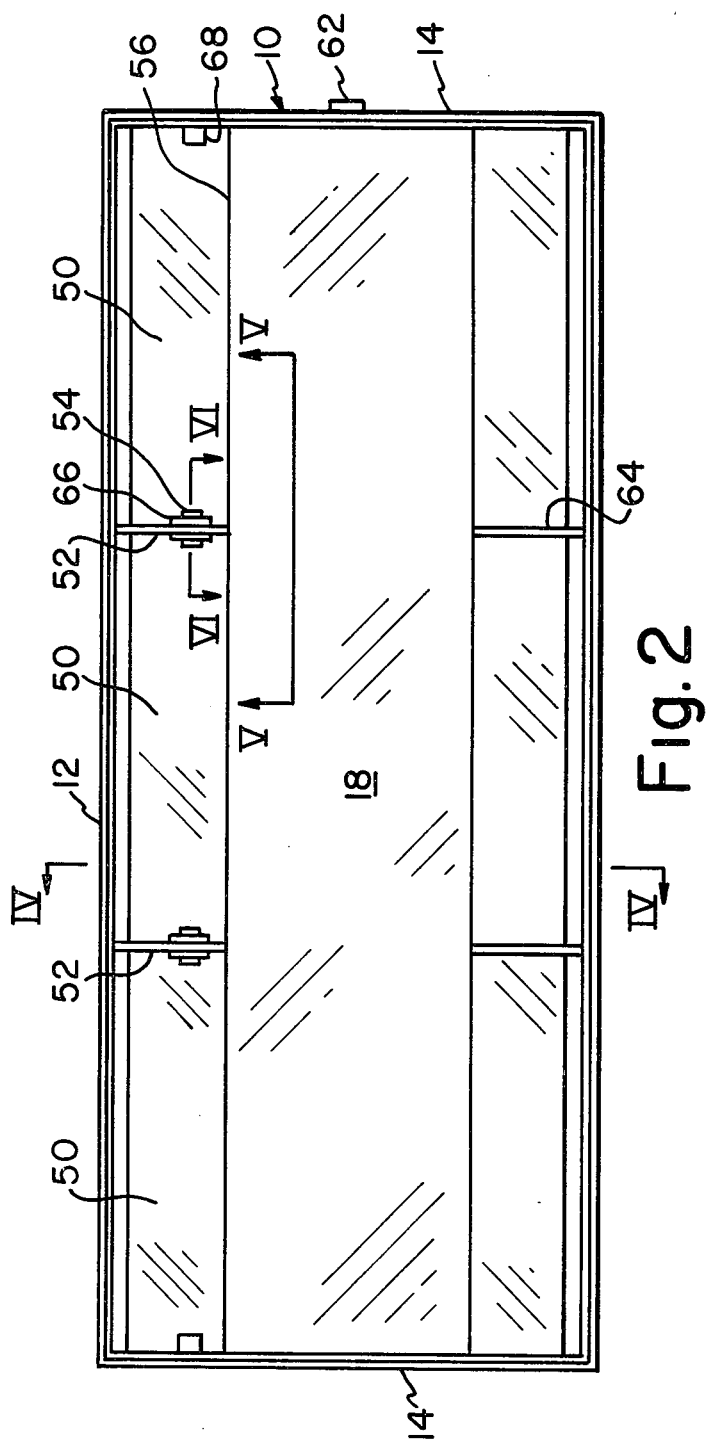
FIG. 2 is a plan view of the water table with the frames removed.
Figure 3:
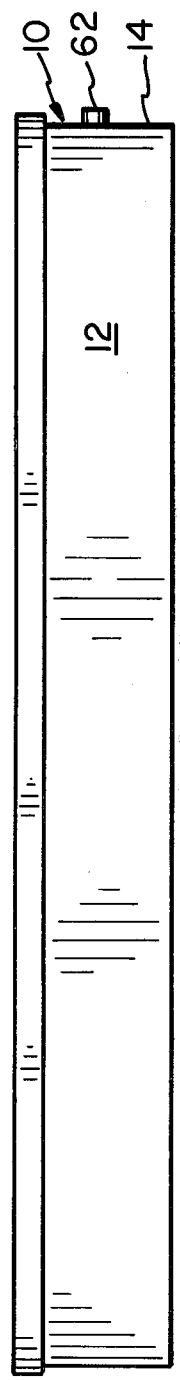
FIG. 3 is an elevation view of the water table of FIG. 2.
Figure 4:
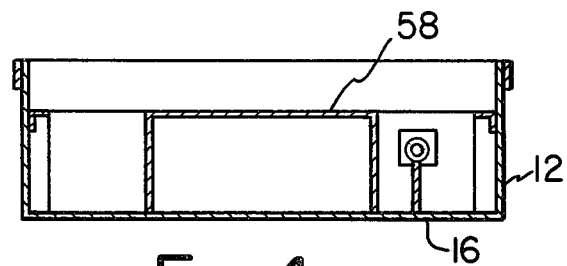
FIG. 4 is a cross-sectional view taken along lines IV—IV of FIG. 2.
Figure 6:
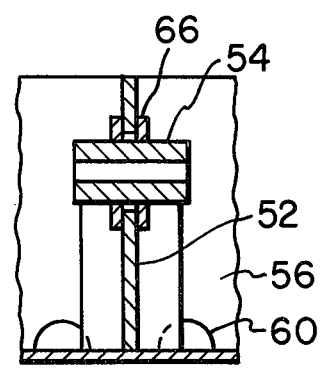
FIG. 6 is a cross-sectional view taken along lines VI—VI of FIG. 2.
Figure 5:
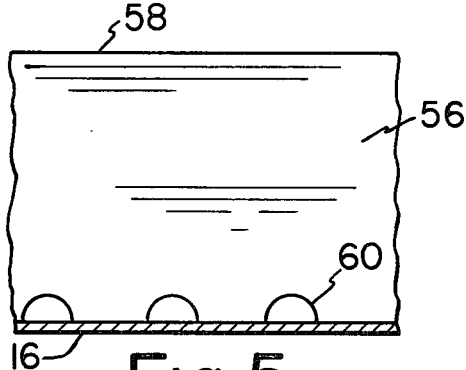
FIG. 5 is a partial cross-sectional view showing a portion of a chamber wall taken along lines V—V of FIG. 2.
Figure 9:
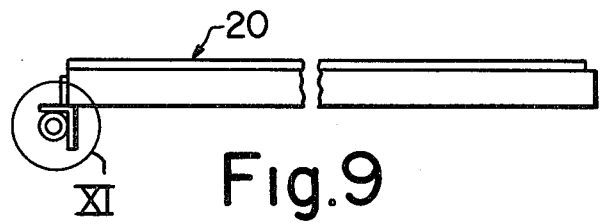
FIG. 9 is a side elevation view of the frame section of FIG. 7.
Figure 7:
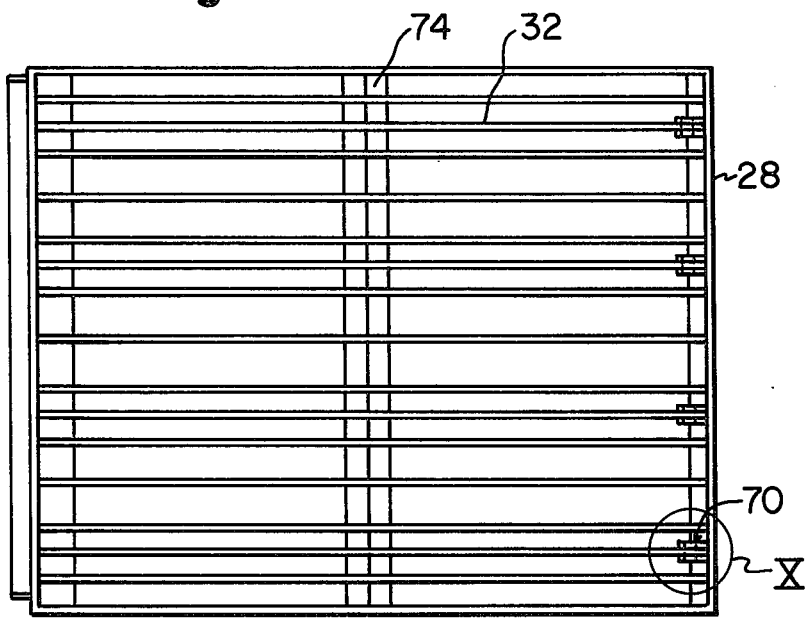
FIG. 7 is a plan view of a frame section of the burning table of the invention.
Figure 8:
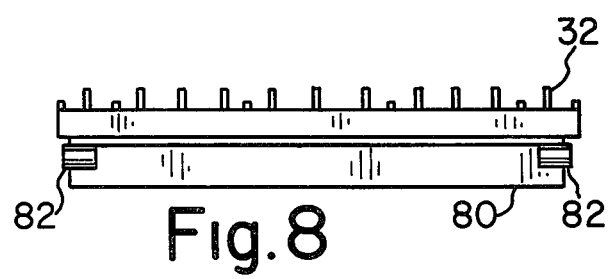
FIG. 8 is an end elevation view of the frame section of FIG. 7.
Figure 13:
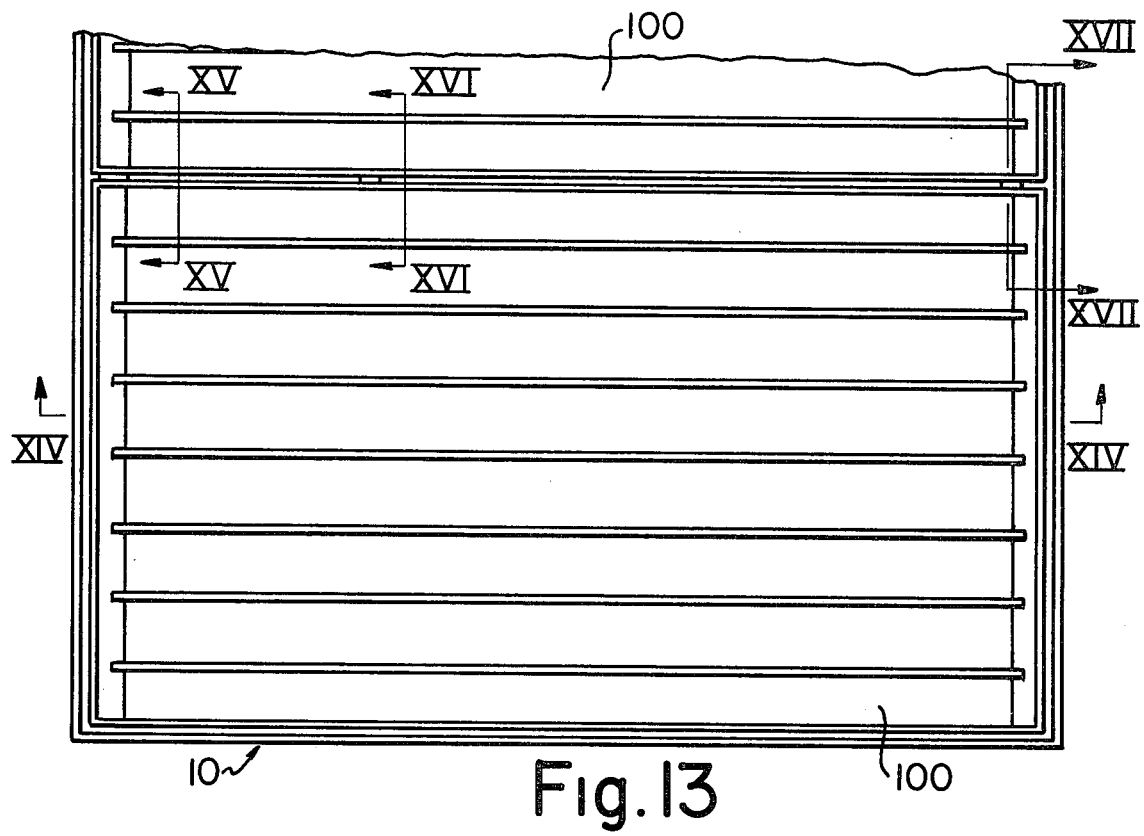
FIG. 13 is a partial plan view of a second embodiment of a water table according to the invention.
Figure 15:
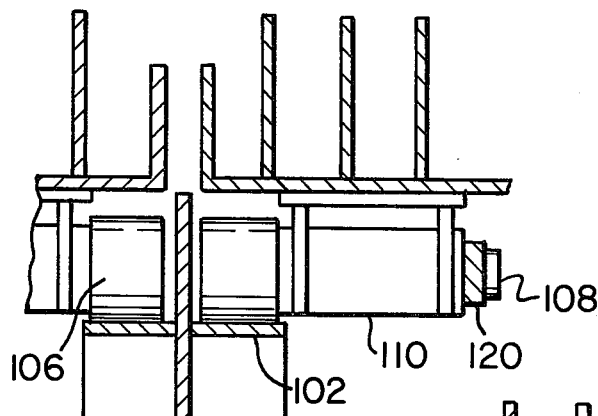
FIG. 15 is a partial cross-sectional view taken along lines XV—XV of FIG. 14.
Figure 16:
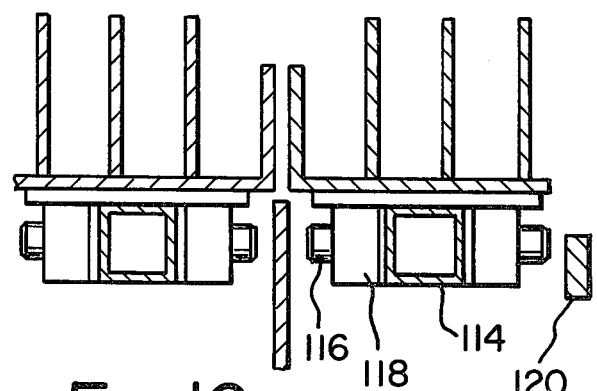
FIG. 16 is a partial cross-sectional view taken along lines XVI—XVI of FIG. 14 showing the pivot structure of two adjacent frames.
Figure 17:
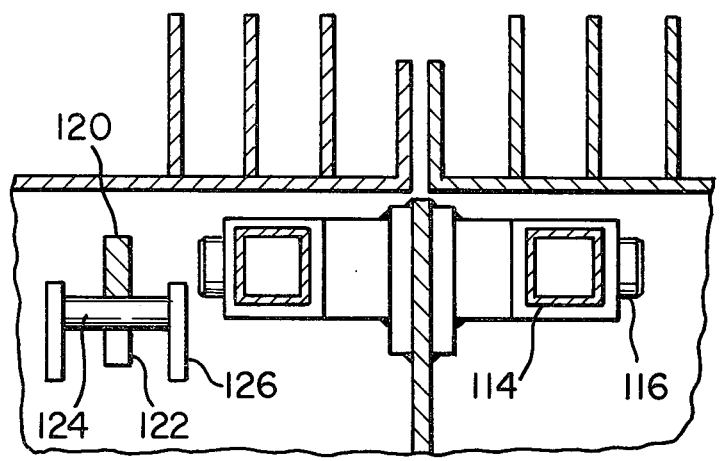
FIG. 17 is a partial cross-sectional view taken along lines XVII—XVII of FIG. 14 showing the end of the frame opposite the pivot structure.

As viewed in FIGS. 2 and 3, the tank 10 (without the frames) has sections 50 for the collection containers adjacent one of the side walls 12 and opposite chamber 18 which extends from one end wall 14 to the opposite end wall of the tank. A pair of transverse walls 52 carrying sleeves 54 for mounting the dumping frames extend between a side wall 12 and a side wall 56 of chamber 18 and are spaced from one another to permit the collection containers to be placed in the tank. As shown in FIGS. 4 and 5, the top wall 58 of the chamber is formed preferably by a steel plate welded to the end walls 14 of the tank and to side walls 56 of the chamber which extend to bottom wall 16 of the tank. There are a series of openings 60 along both of the side walls 56 of the chamber adjacent the bottom wall 16; the openings allow water to pass into and out of the chamber 18 (see FIG. 5). Means, such as inlet 62, are provided in an end wall 14 for introducing gas, e.g. air, into the chamber 18 over the water in the chamber. The third section of the tank is defined by the opposite side wall 12 of the tank, a side wall 56 of the chamber, and the adjoining portions of the bottom and end walls of the tank. A plurality of braces 64 may be used to support the tank.

In the water table illustrated, the section for the collection containers is divided into three parts by the transverse walls 52 which extend from the tank bottom 16 to a height about equal to the height of the side walls 56 of the chamber 18. Each sleeve 54 (see FIG. 6) is mounted in an opening in a wall 52 and a backing plate 66 is provided on each side of the wall to which the sleeve is welded for stability. There is also a sleeve 68 welded to each end wall 14 of the tank in alignment with the sleeves 54 (see FIG. 2). As will be described hereinafter, the sleeves 54 and 68 cooperate with sleeves or slotted blocks mounted on each dumping frame 20 to provide the axis about which a dumping frame can be pivoted to empty waste material or swarf from the frame.

In one embodiment of the invention, as shown in FIGS. 7–12, dumping frame 20 includes a lifting device having lifting lugs 70 located at the end of a burning bar 32. There are preferably two lifting lugs, one near each side of the dumping frame. As shown in the enlarged view of FIG. 10, backing plates 72 are welded to the sides of those bars to which the lifting lugs are secured. Preferably, approximately midway between the end wall 28 of the dumping frame, individual bar lengths, for example in the form of angles 74, are welded between the bars to maintain proper spacing between the bars and for additional strength.

One or more drain openings 76 may also be provided for emptying water from the frame (see FIG. 12). In this form of the invention, openings 76 are elongated and an angle 78 may be provided thereunder to catch swarf which passes through the drain openings.

Secured, as by welding, to the bottom wall 30 of the dumping frame along one side wall 26 of the dumping frame opposite the lifting device is a pivot comprising an L-shaped member 80 which extends from a point spaced from one end wall 28 to a point inward of the other. A tubular sleeve member 82 is secured to the frame, e.g. by welds 84, at each end of the L-shaped member 80 (see FIG. 11). The distance between the outboard ends of the sleeve member 82 is just slightly less than the distance between inwardly opposed ends of the sleeves 52 shown in the tank of FIG. 2. When the sleeve members 82 are aligned with the sleeves 52, a rod 83 may be inserted through the sleeves to provide a pivot axis for the frame 20. Cotter pins or other holding means known in the art may be used to prevent the rods from accidently pulling out of the sleeves.

The relative positions of the dumping frames 20 and collection containers 38 are clearly shown in FIG. 12. During the burning operation, the dumping frames 20 and access frames 22 are in position in the open top or end of the tank providing a burning table. Most of the swarf and other waste material produced during the burning operation which falls onto the access frames 22 falls, by gravity, through the mesh bottom walls 44 of the access frames directly into the collection containers 38 below. The rest of the swarf falls into dumping frames 20. As necessary from time to time, the swarf or waste material in the dumping frame is emptied into the collection containers. This is accomplished by removing the access frames and with the use of a crane or the like attached to lugs 70 pivotably raising tilting the dumping frame 20 to the appropriate dumping position shown in broken lines in FIG. 12. The swarf or waste material falls by gravity into the collection container 38 below and at the lower end thereof. As a safety feature, the connection between the dumping frame and the tank may be designed to shear if the dumping frame is raised beyond its limit. One form of shear connection comprises substituting for the sleeve 82, a block which is welded to member 80 and includes an open slot for engagement with the rod 83. A small bar fastened across the open end of the slot offers resistance if the frame is raised to its maximum height and will shear if that height is exceeded.

If the dumping frame is pivoted closer to a side wall of the tank, the waste material can be dumped directly into one or more collection containers positioned outside the tank.

Figure 20:
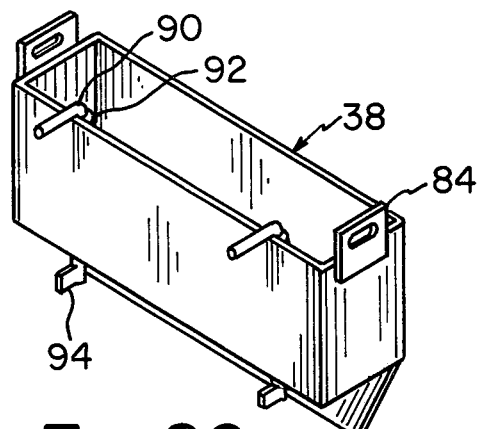
FIG. 20 is a perspective view of one form of collection container useful in connection with the invention.

A suitable collection container 38 is shown in FIGS. 12 and 20. The container is substantially a large box having lifting lugs 84 or the like on opposite ends for removing the container from the tank 10 by means of a crane. There are angular members 86 on the bottom of the containers to space it from the bottom wall 16 of the tank.

The bottom of the container also preferably includes hinges 88 and is releasably latched so that when unlatched the collected material can be dumped directly through the bottom opening of the container. A simplified latch comprising a rotatable rod 90 journaled in a sleeve 92 and having a stop 94 perpendicularly secured on the depending end of the rod is illustrated. Other latch means are, of course, within contemplation and may be used satisfactorily.

In a second embodiment of the invention shown in FIGS. 13-17, a dumping frame 100 extends completely across the top of the water table tank 10 and includes means which enable the frame to travel laterally when it is raised or tilted to permit dumping of swarf or waste material directly into collection containers 38 below the frame. Specifically, a rail 102 is provided along each edge of the dumping frame secured, as by welding, at one end to a side wall 12 of the tank and at the other to vertical supports 104 which extend to the bottom wall 16 of the tank. The rails are spaced apart to permit a collection container 38 to be placed between them and are longer than the width of the collection container. Rollers 106, preferably bronze bushings, rotatably mounted on pins 108 inserted in sleeves 110 mounted on the bottom of the dumping frame at one end, are adapted to travel laterally along the rails as the dumping frame is raised to the position shown in dotted lines in FIG. 14. The extent of travel of rollers is determined by stops 112 at the ends of the rails opposite the side walls.

The dumping frame is raised and lowered by a crane or the like in a manner similar to that of the first embodiment. Elongated members 114 pivotally mounted at one end of the tank to the dumping frame intermediate its side walls and to the pins 116 in sleeves 118 at the other end are also provided for stabilizing the dumping frame during the dumping operation. A safety or latching bar 120 is also provided to prevent the dumping frame from accidently falling from its raised position (for example, if a crane cable snapped). One end of the latching bar is pivotably secured to the end of the dumping frame having the rollers 106. The opposite end of the bar includes a hook member 122 which is adapted to fit over a pin 124 secured on a bracket 126 to side wall 12 of the tank. After the dumping frame is raised to its height, as shown in dotted lines in FIG. 14, the hook member is engaged with the pin to prevent the frame from falling. When it is desired to lower the dumping frame, the hook member 122 is disengaged and the dumping frame lowered into place in the open top of the tank. It is contemplated that other and equivalent means may be employed to provide assurance against undesired lowering of a raised dumping frame.

Figure 18:
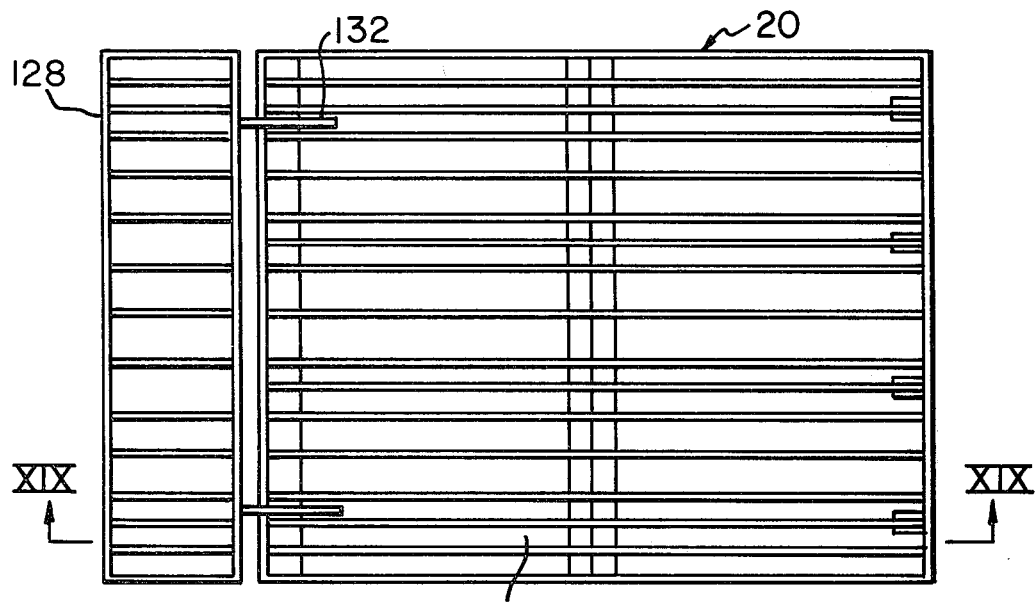
FIG. 18 is a plan view of the burning table of a third and presently preferred embodiment of a water table according to the invention.
Figure 19:
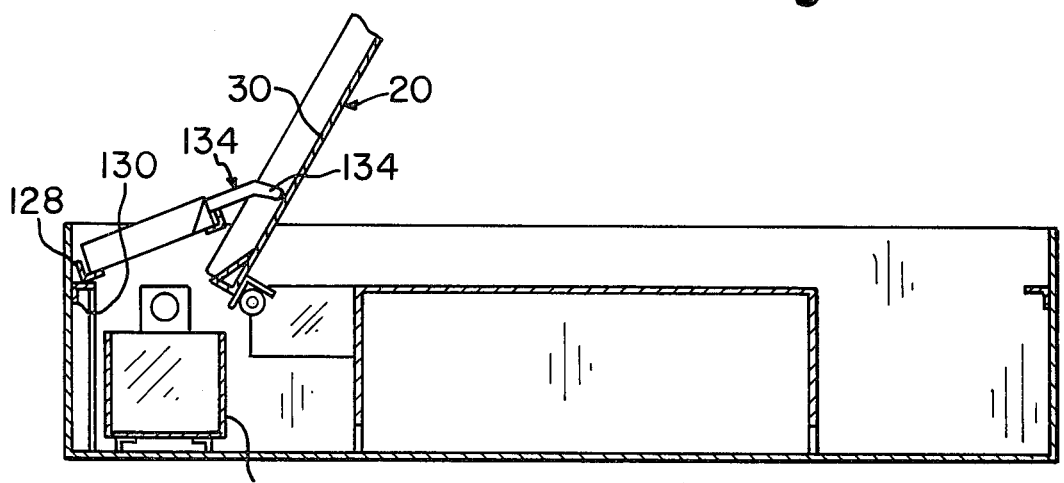
FIG. 19 is a cross-sectional view taken along lines XIX—XIX of FIG. 18.

In a preferred and third embodiment of the invention shown in FIGS. 18 and 19, both access and dumping frames are employed. The basic construction and operation of the dumping frames 20 is the same as described with reference to the first embodiment; however, each access frame 22 has been modified to include means for permitting it to be raised or moved simultaneously with and through the action of raising a dumping frame 20.

The preferable modifications to the access frames 22 comprise extending a stabilizing means such as angle 128 along an edge or side wall 40 of the access frame such that the angle rests upon rail 130 mounted on the side wall of the tank. An elongated arm 132 extends outwardly from the opposite side wall of the access frame, an end 134 of the arm extending in a downwardly direction for contacting the bottom wall 30 of the dumping frame 20. When the dumping frame is raised to the position shown in FIG. 18, the access frame also pivots on the stabilizing means, permitting swarf to be emptied from the dumping frame 20 directly into a collection container 38 positioned below the access frame. It is apparent that it is unnecessary to use either a stabilizing means or an arm shaped exactly like that shown in the drawings as long as the function of raising the access frame with the dumping frame is provided.

In a further modification of the invention, the chamber 18 may be replaced by a chamber formed by skirts which depend from the sides of each dumping frame and extend to a point spaced from the bottom wall of the tank. To change the water level in the tank, gas, such as air, may be introduced through an inlet which extends beneath a skirt and opens above the water level.

By applying air pressure the water level may be raised and by reducing it, the water level may be lowered.

OPERATION

Prior to a burning operation, a workpiece is extended across the burning bars 32 and 46 of the burning table formed by the dumping frames and the access frames, if used, positioned in the top opening of the tank 10. The collection containers 38 are preferably positioned beneath the frames and a sufficient volume of water is provided in the tank such that the upper level of the water is just below the bottom walls 30 and 44 of the frames. Air, for example, is then introduced to the chamber 18 through inlet 62 above the water level under sufficient pressure, for example at a pressure of about 10 psi, so that it displaces the water, raising the water level in the tank generally to such an extent that the water passes over the side walls and into the frames and raises to a height just adjacent the workpiece. Burning then proceeds.

When the operation is completed, the air pressure may be reduced allowing the water to empty from the frames over the walls and through the drain openings and to recede to its initial level. This permits complete access to the inside of the frames for inspection or for any other reason.

At any time that the initial water level is reached, the access frames (when used) may be removed or, if applicable, pivoted, and the waste emptied from the dumping frames into the collection containers.

Figure 21:
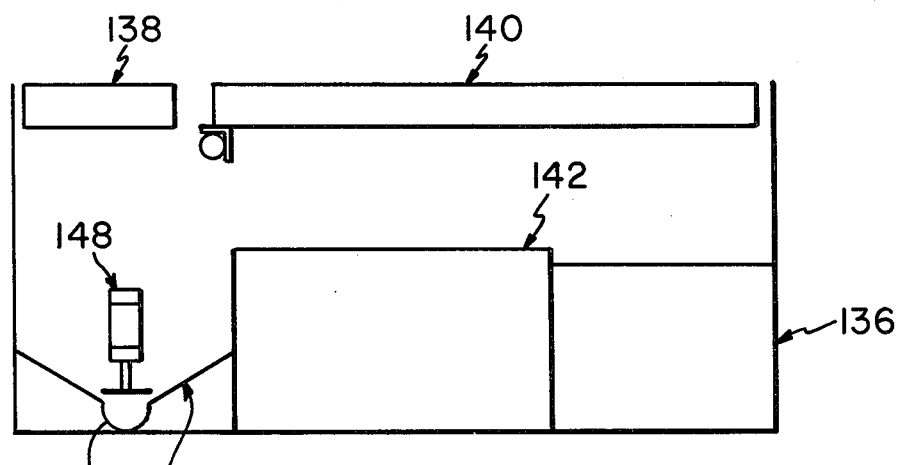
FIG. 21 is a schematic view of still another embodiment of the invention including automatic waste disposal means.

In a modification of the invention shown in FIG. 21, the collection containers may be eliminated and an automatic collection disposal means employed. In this embodiment, automatic flushing or cleaning means of the type disclosed and claimed in U.S. Pat. No. 3,969,132 replace the collection means previously disclosed in a tank 136, which includes a burning table comprising access frame 138, dumping frame 140 and a chamber 142. Any suitable number of frames may be used to provide a burning table. Briefly, the automatic means comprises at least one, and preferably two, sloped plates 144 onto which the swarf or other waste material falls or is dumped and a drain means or channel 146 at the lowest end thereof for catching material from the plates. Means, such as piston or pistons 148 for closing the top opening the channel and flushing it are provided as described in the specification of U.S. Pat. No. 3,969,132, which is incorporated herein by reference.

Having described presently preferred embodiments of the invention, it is to be understood that it may otherwise be embodied within the scope of the appended claims.

We claim:

1. A water table suitable for use with a burning machine comprising:
   A. a tank for holding water;
   B. frame means carrying burning bars positioned in the open top of the tank and forming a burning table;
   C. means for tilting said frame means relative to the tank;
   D. means for supporting said frame means for lateral movement and for stabilizing the frame during tilting of the frame for emptying swarf and for lowering it; and
   E. means for changing the level of water in the tank.

2. A water table as set forth in claim 1 wherein the supporting means comprises:
   1. a pair of rails in and secured to the walls of the tank; and
   2. a pair of rollers mounted on an edge of the frame on opposite side walls thereof for engagement with said rails whereby, when one end of the frame is raised, the opposite end moves transversely on the rollers.

3. A water table as set forth in claim 2 wherein the frames also include a longitudinal member for locking the frame in a raised position comprising means on one end of the member for pivotally securing it to the frame means and latching means on the opposite end of the member for engagement with means provided in the tank.

4. A water table as set forth in claim 1 wherein the stabilizing means comprise at least one elongated member an end of which is pivotally mounted intermediate the side walls of the frame and the opposite end of which is pivotally secured to the tank.

5. A water table as set forth in claim 1 and including collection means within the tank for receiving the swarf emptied from the frame means.

6. A water table as set forth in claim 1 in which the water level changing means comprises:
   1. a chamber in the tank in fluid communication with the balance of the tank; and
   2. means for introducing into and exhausting gas from the chamber above the water therein.

7. A water table suitable for use with a burning machine comprising:
   A. a tank for holding water;
   B. frame means carrying burning bars mounted in the tank and forming a burning table, said frame means comprising at least one box-like structure having a substantially imperforate bottom wall which catches waste material produced by the burning machine;
   C. means mounting the frame means such that the frame is removable from the tank; and
   D. means for changing the level of water in the tank comprising:
      1. a chamber in fluid communication with the balance of the tank; and
      2. means for introducing into and exhausting gas from the chamber above water therein whereby the water in the tank can be regulated between a level below the frame means and a level above the frame means.

8. A water table as set forth in claim 7 wherein the chamber in fluid communication with the balance of the tank is positioned within the tank.

9. A water table as set forth in claim 7 wherein the frame means comprises a plurality of frames.

10. A water table as set forth in claim 9 wherein the plurality of frames comprise removable access frames and removable dumping frames, each access frame comprising a box-like structure having a perforate bottom wall and each dumping frame having a substantially imperforate bottom wall.

11. A water table suitable for use with a burning machine comprising:
   A. a tank for holding water;
   B. frame means carrying burning bars mounted in the tank and forming a burning table;
   C. means mounting the frame means such that the frame means is movable relative to the tank, said mounting means being a pivot whereby the frame means can be moved for emptying waste material into a collection means; and
D. means for changing the level of water in the tank comprising:
1. a chamber in fluid communication with the balance of the tank; and
2. means for introducing into and exhausting gas from the chamber above water therein whereby the water in the tank can be regulated between a level below the frame means and a level above the frame means.

12. A water table as set forth in claim 11 wherein the frame means has a substantially imperforate bottom wall.

13. A water table as set forth in claim 11 wherein the chamber in fluid communication with the balance of tank is positioned within the tank.

14. A water table as set forth in claim 11 wherein the frame means comprises a plurality of frames.

15. A water table as set forth in claim 14 wherein the plurality of frames comprise removable access frames and pivotable dumping frames, each access frame comprising a box-like structure having a perforate bottom wall and each dumping frame having a substantially imperforate bottom wall.

16. A water table suitable for use with a burning machine comprising:
A. a tank for holding water;
B. frame means carrying burning bars mounted in the tank and forming a burning table, said frame means comprising a plurality of frames including access frames and dumping frames, the access frames each having a perforate bottom wall and the dumping frames each having a substantially imperforate bottom wall;
C. means mounting the access frames so as to be separable from the tank and means mounting the dumping frames for pivotal movement with respect to the tank such that swarf produced can fall directly through the access frames into collection means and can be dumped into the collection means from the dumping frames; and
D. means for changing the level of water in the tank comprising:
1. a chamber in fluid communication with the balance of the tank; and
2. means for introducing into and exhausting gas from the chamber above water therein whereby the water in the tank can be regulated between a level below the frame means and a level above the frame means.

17. A water table as set forth in claim 16 wherein the chamber in fluid communication with the balance of the tank is positioned within the tank.

18. A water table as set forth in claim 16 and including means extending from a wall of the access frame for contacting the dumping frame such that when the dumping frame is raised the access frame is simultaneously raised by the action of the extending means.

19. A water table suitable for use with a burning machine comprising:
A. a tank for holding water;
B. frame means carrying burning bars mounted in the tank and forming a burning table, said frame means comprising a plurality of frames comprising removable access frames and dumping frames, each access frame comprising a box-like structure having a perforate bottom wall and each dumping frame having a substantially imperforate bottom wall, and the dumping frames being pivotally mounted in the tank;
C. means mounting the frame means such that the frame is vertically moveable relative to the tank; and
D. means for changing the level of water in the tank comprising:
1. a chamber in fluid communication with the balance of the tank; and
2. means for introducing gas into and exhausting gas from the chamber above water therein whereby the water in the tank can be regulated between a level below the frame means and a level above the frame means.

* * * * *